United States Patent
Ferro

[11] 3,719,383
[45] March 6, 1973

[54] REMOVABLE CAMPER UNIT
[76] Inventor: Michael Ferro, 18 77th Street, Brooklyn, N.Y. 11209
[22] Filed: Sept. 30, 1970
[21] Appl. No.: 76,675

[52] U.S. Cl..............................296/23 MC, 296/26
[51] Int. Cl. ................................................B60p 3/32
[58] Field of Search.........296/23, 23 MC, 26, 27, 99, 296/137 B

[56] References Cited
UNITED STATES PATENTS 3,253,857 5/1966 Deisenroth........................296/137 B
3,084,973 4/1967 Beckley..............................296/31 P

*Primary Examiner*—Philip Goodman
*Attorney*—Howard E. Thompson, Jr. and Salvatore C. Mitri

[57] ABSTRACT

A camper unit is provided which can be removably secured to the top of a flat-roofed vehicle such as a Volkswagon station wagon or the like. The camper unit can be adapted to provide internal and external storeage areas and bunk space, and is intended for use with a transporting vehicle having means to enter the unit from the interior of the vehicle.

7 Claims, 5 Drawing Figures

PATENTED MAR 6 1973 3,719,383

INVENTOR.
MICHAEL FERRO

BY
Howard E. Thompson Jr.
Salvatore C. Mitri
ATTORNEYS

REMOVABLE CAMPER UNIT

This invention relates to a camper unit which can be removably secured to the top of a flat-roofed vehicle. More particularly, this invention relates to a removable camper unit which is of sufficient size to provide interior bunk space and storage areas and which can be adapted to also provide an external storage area. Even more particularly, the camper unit of this invention is intended for use with a transporting vehicle having means whereby the interior of the camper unit is accessible from the interior of the vehicle.

BACKGROUND OF THE INVENTION

With the increased accessibility to nationally maintained and preserved park areas through improved roads and highway systems — particularly in the United States — and the creation of more leisure time for man, there has been provided a great number and variety of vehicles, trailers, camping units and the like for man's use as a means for him to enjoy and visit these park areas leisurely and at low cost.

Since many state highways, thruways, freeways and toll roads prohibit hitched and towed trailers, units have been provided which can be carried on a vehicle as a separate unit or which are constructed to be an integral part of the carrying vehicle. Exemplary of a unit constructed integrally with its carrying vehicle is that which is disclosed in U.S. Pat. No. 3,190,689 to Calthorpe. In this type of unit, a collapsible roof construction is provided so that, with the roof collapsed, less wind resistance is offered during travel and, with the roof raised when the vehicle is parked, head room, visibility, bunk space and storage areas are provided. With this type of unit, as well as with those wherein the roofs are not collapsible, the unit is constructed as an integral part of the transporting vehicle and entrance or access to the interior of the unit is normally made through the unit itself and not through the vehicle.

U.S. Pat. No. 3,283,452 to Hayes and U.S. Pat. No. 3,357,031 to Edwards illustrate two different types of units that can be carried on a transporting vehicle and then assembled for use at a point of destination. Many units similar to those illustrated in these patents are presently in use, but these types of units are not intended for integral use with a vehicle since the vehicle serves only as the means for transporting the units.

THE INVENTION

It has now been found that a camper unit can be provided which can be transported by a vehicle and which can be an integral part of the transporting vehicle when in use and then be removed from the transporting vehicle when its use is completed. Hence, the camper unit of the invention is designed for use with a flat-roofed vehicle having means of access and entry into the interior of the unit from the interior of the vehicle.

In general, the camper unit of the invention comprises opposed front and rear walls of a length about equal to the width of the roof of the vehicle upon which the unit is to be placed; opposed side walls, each of which is joined to said front and rear walls at their edge extremities and which are of a length about equal to the length of the roof of the vehicle upon which the unit is to be placed; a roof section spanning across said opposed side walls, the edges of said roof being joined to the upper edges of said side walls and the front edge of said roof being joined to the upper edge of said front wall, said roof section extending rearwardly from said front wall toward said rear wall a distance of at least about one-half the length of said vehicle; and, means for detachably securing said unit to the roof of said vehicle.

In one embodiment, a portion of the opposed side walls intermediate their ends is of a greater height than the remaining portions. These raised sections are preferably of a height so that an individual of average size can easily stand erect in the body of the transporting vehicle with the upper portion of the individual's torso extending through an access means in the roof of the vehicle. With respect to the front wall, these raised sections form a step-like structure thereby providing an aerodynamic contour which results in reduced wind resistance during transport.

In a preferred embodiment, the rear portion of the unit is also contoured to provide a combination of internal storage spaces and an external storage area, the internal storage spaces being sufficient to accommodate rigid, elongated articles such as fishing poles, collapsible bunks, and the like, and the external storage area being sufficient to accommodate large, bulky, articles such as suit cases, knapsacks, and the like.

The camper unit of the invention can be constructed from any light weight material such as aluminum, plywood, moldable plastics and the like, or combinations thereof, and can be provided in several, separate parts which can be joined together by any means known to those skilled in the art. Preferably, the unit is provided as a unitary, plastic structure such as by employing well-known plastic laminating techniques and processes wherein a mold is obtained from a plug and the final structure obtained from the mold by a series of successive laminating steps utilizing, for example, fiberglass as the laminating material.

The invention will be more fully comprehended from the ensuing, detailed description when considered together with the accompanying drawing wherein the several views illustrate preferred embodiments thereof and wherein.

Figure 1:
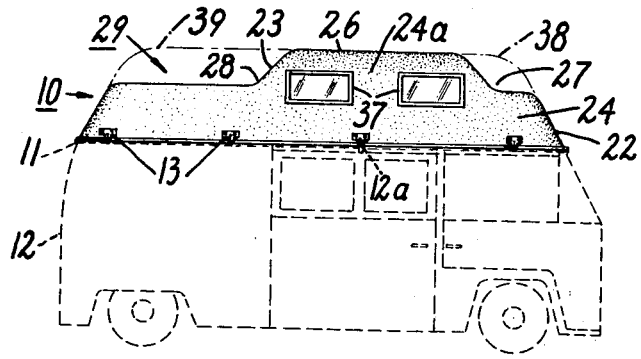
FIG. 1 is a side elevational view illustrating the camper unit of the invention detachably secured to the roof of a transporting vehicle, the body of which is shown in dotted lines.
Figure 1A:
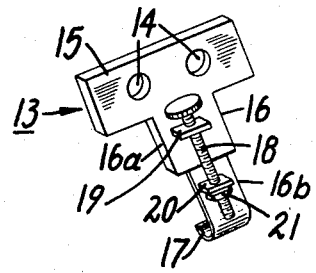
FIG. 1a is a perspective view of one type of clamping means which can be employed to removably secure the unit to the roof of a vehicle.

As shown in FIGS. 1 and 1a, the camper unit of the invention, generally shown at 10, can be detachably secured to the roof 11 of a vehicle 12, the body of which is shown in dotted lines, by means of a plurality of T-clamps 13. Clamps 13 are commercially available and, as illustrated in FIG. 1a, are generally provided with a plurality of apertures 14 in the bar section 15 thereof through which screws, bolts, rivets and the like can be inserted for securing the clamps 13 to the camper unit 10. The long leg section 16 of clamp 13 is provided in two sections 16a and 16b, section 16a being channelled to telescopically receive section 16b. The free end of section 16b is curved inwardly and upwardly as at 17 so that it can be secured to the lower edge of roof 11 or extended to be secured in the upper edge of a door opening of the vehicle 12 as indicated at 12a (FIG. 1). Sections 16a and 16b are interconnected by means of a bolt 18, the body of which extends substantially along leg 16. The upper portion of bolt 18 is engaged by and secured to section 16a by means of metal strap 19 and the lower portion of bolt 18 is also engaged by and secured to section 16b by means of another metal strap 20. A nut 21 is threaded to the lower end of bolt 18. Hence, the length of leg 16 can be adjusted by loosening or tightening nut 21.

Figure 2:
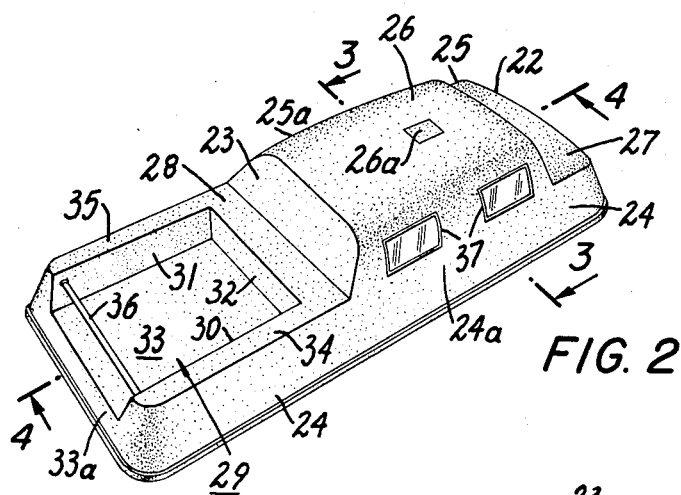
FIG. 2 is a perspective view of the camper unit shown in FIG. 1.

With reference to FIGS. 1 and 2, it can be seen that the camper unit 10 generally comprises a front wall 22 and an opposed rear wall 23, a pair of opposed side walls 24, 25 and a roof section 26. In the full line embodiments illustrated in FIGS. 1 and 2, the side walls 24, 25 are constructed to provide raised sections 24a, 25a, respectively, intermediate their ends. As a result, a forward step 27 is formed at the front end of the camper unit 10 and another step 28 is similarly formed at the rear of camper unit 10.

Figure 4:
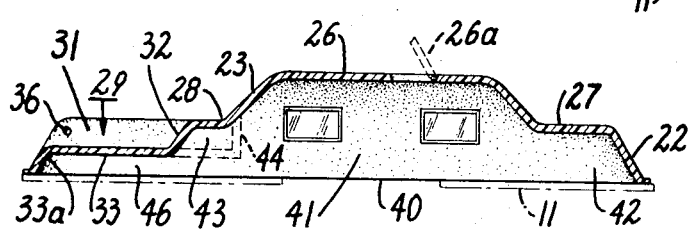

In a particularly preferred embodiment, that portion of the camper unit extending rearwardly from rear step 28 is constructed to provide an exterior storage area generally indicated at 29 and defined by inner opposed side walls 30, 31, an inner front wall 32 and deck 33, the rear extremity of which is curved downwardly toward roof 11 as at 33a (FIGS. 2 and 4). As indicated earlier, external storage area 29 can be utilized for storing large, bulky items therein. To provide rigidity and reinforce the structure, particularly when the unit is of one-piece construction, the upper edges of inner side wall 30 and side wall 24 and the upper edges of inner side wall 31 and side wall 25 are each joined together by rearwardly extending portions 34, 35, respectively, of rear step 28 as clearly seen in FIG. 2. Additionally, a bar 36 or similar retaining means can be secured between inner side walls 30, 31 at the rear of storage area 29 transversely across deck 33 as shown in FIG. 2.

Raised sections 24a, 25a of side walls 24, 25 should be of a height sufficient to permit an individual of average height to stand within vehicle 12 with head and shoulders extending into the camper unit 10 without that individual's head touching roof 26. The combined height from the floor of vehicle 12 to roof 26 should, therefore, be about 6 feet. Hence, raised sections 24a, 25a should be from about 12 to 18 inches in height and ports or windows 37 can be provided in these raised sections for visibility and ventilation. Although not shown, it will be obvious that ports or windows can be similarly provided above the forward and rear step sections 27, 28, respectively.

A vent 26a is also preferably provided in roof 26 for venting odors and gases, particularly those resulting from cooking. Vent 26a can be conventionally a hinged door having means to open it upwardly as shown in FIG. 4 and can be provided with a screen (not shown) associated with the opening to keep out pests and insects when the vent is open.

Although not critical, it is preferred that the assembled camper unit 10 have a contour that will minimize wind resistance during transport. Where applicable, therefore, all outer exposed wall areas, such as front and rear walls 22, 23, side walls 24, 25, step sections 27, 28, and the like, should be slightly inclined from the vertical so that they are curved and disposed inwardly toward each other up to roof 26 as clearly shown in FIG. 2. It has been found that such a contour will significantly minimize wind resistance of the camper unit during transport. It should be understood, therefore, that the contoured assembly described immediately hereinabove will hereinafter be referred to in the remaining description and appended claims by the term "aerodynamic contour."

As indicated earlier, the camper unit of the invention is intended for use with a vehicle having a port or other means in its roof to facilitate entry and access into the unit from the interior of the vehicle. Typically, Volkswagon bus-styled station wagons are commercially produced with such ports and are also equipped with means to open and close these ports. Hence, when the camper unit is removed from such a vehicle, the vehicle can be readily restored to a weatherproof condition by closing or covering the port with the means provided.

Figure 3:
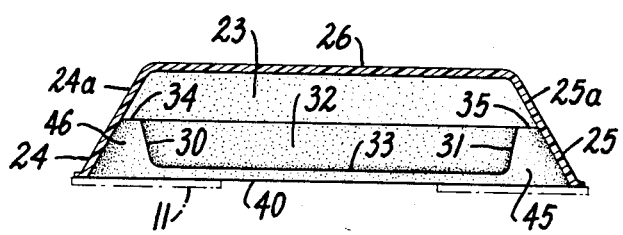
FIG. 3 is a transverse sectional view taken substantially on the line 3—3 of FIG. 2; and, FIG. 4 is a cross-sectional view taken through a longitudinal axis of the camper unit, substantially on the line 4—4 of FIG. 2.

In FIGS. 3 and 4, the interior of the camper unit 10 of the invention is illustrated with the unit mounted on the roof 11, shown in dot-dash lines, of a vehicle having an entry means or port 40 provided therein. As can be seen in FIG. 4, ample head room can be provided within the interior of the camper unit beneath roof 26 in combination with port 40 as indicated at 41. At the forward end of camper 10, an internal area 42 is formed and is sufficient to accommodate bunk space for a small adult or child when the height of side walls 24, 25 thereat is from about 10 to 12 inches. A similar area is also formed beneath rear step 28 as indicated at 43. Alternately, this rear internal area 43 can be enclosed, as shown in dotted lines at 44, to provide means for installing one or more shelves or an enclosed closet area for additional storage of small items.

Lateral storage for long, rigid items such as fishing poles, collapsible bunks, and the like during transit is also provided in the rear portions of camper 10 as shown at 45 and 46 in FIGS. 3 and 4. These areas are generally formed by extension 34, inner side wall 30 and side wall 24 to define area 46 and, on the other side, by extension 35, inner side wall 31 and side wall 25 to define area 45.

Collapsible bunks can be set up within the unit 10 on roof 11 adjacent either or both sides of port 40 and extend from internal area 42 to internal area 43 (FIGS. 3 and 4) so that a person can easily lie down and stretch out with his feet extending into internal area 42 and his head adjacent rear wall 23 and have ample head and foot room for sleeping.

Although the camper unit of the invention has been described in some detail and with particularity, it should be understood that various changes and modifications can be made therein by those skilled in the art and those utilizing the unit without departing from the scope and spirit of the invention.

What is claimed

1. A camper unit for transport on a substantially flat-roofed vehicle having port means formed in the roof thereof, said camper unit being of one-piece, rigid construction and comprising: opposed front and rear walls of a length about equal to the width of said vehicle roof; opposed side walls of a length about equal to the length of said vehicle roof, said side walls being joined to said front and rear walls substantially at the corners of said vehicle roof; and each of said side walls having a raised section intermediate their ends; a raised roof section in alignment with said port means and spanning at least a part of the area defined by said front and rear walls and said opposed side walls, said raised roof section being joined to the upper edges of said front and rear walls and said opposed side walls such that that portion of said raised roof section overlying the port means in said vehicle roof is of a height sufficient to permit an individual to stand erect within said vehicle; a forward step and a rear step at each end of said raised roof section, each of which is of intermediate height; a pair of narrow sections on each side of said rear step extending therefrom to the rear of said camper unit; a deck section extending rearwardly from said rear step between said narrow sections, said deck section and said narrow sections defining an external storage area; and, means for detachably securing said camper unit upon said vehicle roof.

2. The camper unit as defined in claim 1 wherein said front and rear walls and said opposed side walls are slightly inclined from the vertical and curved inwardly toward each other up toward said roof section to provide an aerodynamic contour.

3. The camper unit as defined in claim 1 wherein the raised portions of said side walls contain port means for ventilation and visibility and said roof contains a vent means.

4. The camper unit as defined in claim 1 wherein a transverse retaining means is provided across the open end of said external storage area.

5. The camper unit as defined in claim 1 wherein said deck is of a width less than the width of said camper unit such that internal elongated, lateral storage areas are provided within said unit.

6. The camper unit as defined in claim 1 wherein enclosed storage areas are provided within said unit between the upper surface of said vehicle roof and the inner surfaces of said forward and rear steps.

7. The camper unit as defined in claim 1 wherein said raised roof section is of a length such that there is provided between its inner surface and the upper surface of said vehicle roof an enclosed area sufficient to accommodate therein at least one bunk for sleeping.

* * * * *